United States Patent [19]

Chadwick

[11] 4,177,019

[45] Dec. 4, 1979

[54] HEAT-POWERED WATER PUMP

[75] Inventor: Duane G. Chadwick, Logan, Utah

[73] Assignee: Utah State University Foundation, Logan, Utah

[21] Appl. No.: 890,095

[22] Filed: Mar. 27, 1978

[51] Int. Cl.² .................. F04B 17/00; F03G 7/02; F03G 7/06

[52] U.S. Cl. ..................... 417/379; 60/531; 60/641; 417/394

[58] Field of Search ............... 417/570, 379, 375, 394; 60/641, 531

[56] References Cited

U.S. PATENT DOCUMENTS

| | | | |
|---|---|---|---|
| 490,526 | 1/1893 | Wheeler | 417/570 |
| 1,780,336 | 11/1930 | Canton | 417/394 |
| 2,212,281 | 8/1940 | Ullstrand | 62/118 |
| 2,688,923 | 9/1954 | Bonaventura et al. | 60/641 X |
| 2,755,745 | 7/1956 | Lewis | 417/379 |
| 2,867,974 | 1/1959 | Wenander | 417/379 X |
| 2,918,219 | 12/1959 | MacCracken | 417/379 X |
| 3,309,012 | 3/1967 | Booth et al. | 417/394 X |
| 4,089,325 | 5/1978 | Brola | 60/641 X |

FOREIGN PATENT DOCUMENTS

| | | | |
|---|---|---|---|
| 635283 | 12/1927 | France | 126/271 |
| 1036504 | 9/1953 | France | 417/379 |
| 158478 | 4/1957 | Sweden | 417/379 |

*Primary Examiner*—Leonard E. Smith
*Attorney, Agent, or Firm*—J. Winslow Young; H. Ross Workman; Rick D. Nydegger

[57] ABSTRACT

A heat-powered water pump including a vapor generator and a vapor-inflatable pumping member enclosed in a pumping chamber. The vapor generator and pumping member form a closed system for a volatile working fluid. Check valves control the movement of vapor and condensate through the closed system as well as the direction of water through the pump. The vapor generator is configurated to be heated either by a solar concentrator or by heat from combustion of agricultural wastes. The expandable diaphragm/pumping piston operates in a pumping chamber having a diametrally enlarged check valve above the diaphragm to accommodate the rapid explusion of water from the pumping chamber upon expansion of the expandable diaphragm.

15 Claims, 1 Drawing Figure

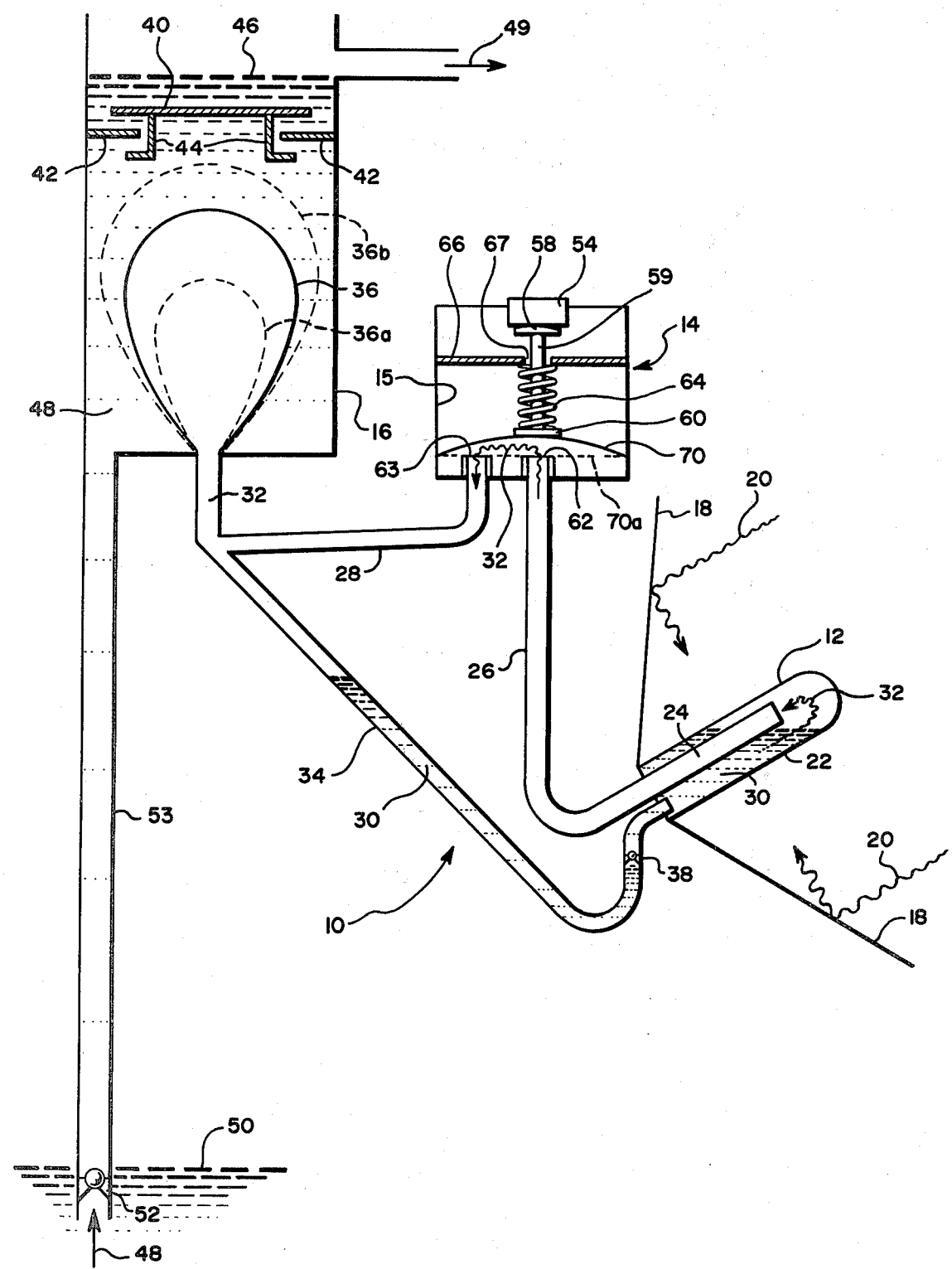

HEAT-POWERED WATER PUMP

BACKGROUND

1. Field of the Invention

This invention relates to water pumps and, more particularly, to heat-powered water pumps.

2. The Prior Art

Throughout the world there are many places where fuel and power are expensive because of limited fossil fuel deposits, transportation difficulties, extended electrical transmission lines, and the like. Even the production of electrical energy by diesel engines results in an excessive cost for electrical power when considered in light of the costs associated with the initial equipment purchase, fuel, transportation of the fuel, and repairs. In addition, the projected fossil fuel shortages will result in continually increasing fuel costs.

However, cheap and abundant energy is necessary for a high material standard of living. It is only when humanity can multiply mechanical work many times beyond muscle power that enough goods and services can be produced to provide the economic conditions for a reasonably satisfactory standard of living. Although fuel and energy are reasonably available and at a relatively reasonable cost in the currently industrialized areas of the world, in the remote areas of the world the relatively high costs for fuel and energy, particularly electrical energy, substantially inhibits the further development of those portions of the world. For example, vast areas of the world are suitable for irrigation with relatively abundant sources of water being relatively readily available. However, these areas also require an economical technique for raising the water from a relatively shallow water table or nearby stream to the surface for irrigation. Most primitive devices for lifting this water include simple devices operated by one or two men or through the use of animal energy. However, animals consume food grown on irrigated land, part of which might otherwise be used for human food. Additionally, the use of manpower to pump water is particularly wasteful since man's labor can be more economically utilized in providing goods and services rather than mechanical energy.

Coincidentally, although there are many parts of the world where fuel and electrical power are expensive because of long distances from coal or oil deposits, transportation difficulties, or small-scale rather than large-scale operations, these same locations are also endowed with an abundance of available solar energy. On a comparative basis, solar energy does appear to be feasible in providing the necessary energy for the efficient pumping of water. Although solar energy is produced only while the sun is shining, pumping irrigation water, which involves no storage of power, offers a good area for the early use of solar energy. In these situations, the economic comparisons between solar energy and other energy sources appear to be sufficiently advantageous to encourage further research and development of solar energy. In addition, for those times when the sun is not shining, substitute thermal energy could be obtained from burning agricultural wastes such as stubble, chaff and the like.

Various types of water or fluid pumps operable from heat sources are shown in U.S. Pat. Nos. 2,050,391; 2,553,818; 2,688,922; 2,744,470; 2,757,618; 2,954,741; 2,973,715; 3,659,960; 3,765,799; and 3,790,305. However, the devices represented in each of the foregoing patents tend to be either complex, expensive to fabricate and maintain or require excessive monitoring for efficient utilization in the less developed sections of the world.

In view of the foregoing, it would, therefore, be an advancement in the art to provide a heat-powered water pump which is operable to pump water from a relatively shallow location to an elevated location, the pump operating relatively independently of continuous monitoring. In addition, it would be an advancement in the art to provide a heat-powered water pump which can utilize either solar energy or thermal energy from burning agricultural wastes. Such an invention is disclosed and claimed herein.

BRIEF SUMMARY AND OBJECTS OF THE INVENTION

The present invention relates to a heat-powered water pump which is configurated to cyclically force water from a pumping chamber by means of a vapor-expandable diaphragm. The vapor is produced in a vapor generator upon the application of heat. Heat for the vapor generator may be supplied either by a solar concentrator or by the combustion of agricultural waste or the like. The vapor is prevented from entering at the expandable diaphragm by a spring-biased valve until a predetermined threshold pressure is reached. A diametrally enlarged check valve above the pumping diaphragm in the pumping chamber permits the rapid expulsion of water from the pumping chamber upon vapor inflation of the expandable diaphragm. The expandable diaphragm also serves as a heat exchange surface to condense the vapor, the condensate being returned to the vapor generator.

In view of the foregoing, it is, therefore, a primary object of this invention to provide improvements in heat-powered water pumps.

Another object of this invention is to provide improvements in the method of pumping water with the heat-powered water pump.

Another object of this invention is to provide a heat-powered water pump which is adapted to cyclically pump water from a relatively shallow location to an elevated location.

Another object of this invention is to provide a heat-powered water pump which may be operated by solar energy.

Another object of this invention is to provide a heat-powered water pump which may be operated by the combustion of agricultural waste and the like.

These and other objects and features of the present invention will become more fully apparent in the following description and appended claims taken in conjunction with the accompanying drawing.

BRIEF DESCRIPTION OF THE DRAWING

The drawing is a schematic illustration of the heat-powered water pump of this invention.

DETAILED DESCRIPTION OF THE PREFERRED EMBODIMENTS

The invention is best understood by reference to the drawing wherein like parts are designated with like numerals throughout.

With particular reference to the drawing, the heat-powered water pump of this invention is shown generally at 10 and includes a vapor generator 12, a pressure regulator valve 14 and a vapor-inflatable, flexible pumping member 36 enclosed in a pumping chamber 16. A pipe 53 interconnects pumping chamber 16 with a body of water 50 and includes a check valve 52 to inhibit the reverse flow of water into body of water 50. The vapor generator 12 is configured as a hollow, cyclindrical tube 22 having an upwardly directed orientation. A vapor tube 24 extends along a substantial portion of the internal length of the cylindrical tube 22 and has an upper, open end for the entry of a vapor 32 thereinto. The upward orientation of vapor generator 12 accommodates the collection of a pool of condensate 30 below the inlet to vapor tube 24 to inhibit condensate 30 from being carried over with vapor 32.

As shown in the illustrated embodiment, vapor generator 12 is surrounded by a solar reflector 18 for the purpose of concentrating a solar flux 20 thereon. Clearly, however, solar reflector 18 may be selectively removed from vapor generator 12 and vapor generator 12 exposed to heat from a conventional combustion source such as burning agricultural wastes or the like. In either event, sufficient thermal energy is absorbed by condensate 30 to produce vapor 32.

Vapor 32 is produced by the volatilization of any suitable working fluid such as cyclopentane (boiling point 50° C.) or the like. Vapor 32 passes through vapor tube 24 into a conduit 26 that is selectively occluded by valve 14. Valve 14 is configurated to hold vapor 32 under pressure in vapor generator 12 and conduit 26 until a predetermined threshold pressure is reached and thereafter open.

Valve 14 is interposed between conduits 26 and 28 to control the flow of vapor 32 from vapor generator 12 into pumping member 36. Valve 14 is configured as a magnetically assisted valve having an enclosure 15 with valve seats 62 and 63 extending upwardly therein and which form an inlet and an outlet for conduits 26 and 28, respectively. A flexible diaphragm 70 transects enclosure 15 and serves as a stopper for valve seats 62 and 63. The operation of diaphragm 70 in cooperation with valve 14 will be discussed more fully hereinafter.

The remainder of valve 14 includes a stopper 60 interconnected to a ferromagnetic head 58 by a nonferromagnetic shaft 59. A flange 66 having an aperture 67 therein serves as a guide for shaft 59 and also an abutment surface for a spring 64 compressed between stopper 60 and flange 66. A magnet 54 is mounted to housing 15 and is superimposed over head 58.

In operation, flexible diaphragm 70 is configured to rest on valve seats 62 and 63 as shown by broken lines at position 70a. In this configuration, vacuum developed in pumping member 36 is effectively stoppered at valve seat 63 by flexible diaphragm 70 and the vacuum is, therefore, inhibited from affecting the sealing relationship between valve seat 62 and flexible diaphragm 70.

The tension of spring 64 is selectively predetermined so as to accommodate a sufficient pressure buildup in vapor 32 in conduit 26 until a threshold pressure is reached. As the threshold pressure is reached, a limited amount of leakage of vapor 32 occurs between valve seat 62 and diaphragm 70. This limited pressure leakage is not allowed to escape through valve seat 63 into conduit 28 since flexible diaphragm 70 is maintained in sealing relationship by the vacuum imposed in pumping member 36. A continued leakage of vapor 32 past valve seat 62 continues until the area below flexible diaphragm 70 (at position 70a) is filled with vapor of sufficient pressure to overcome the compressive strength of spring 64 allowing magnet 54 to assist in attracting head 58 upwardly. The attractive strength of magnet 54 for valve head 58 is sufficient to overcome a substantial portion of the compressive strength of spring 64 although the compressive strength of spring 64 is stronger than the attractive force between magnet 54 and head 58. However, vapor pressure underneath flexible diaphragm 70 continues to be exerted over the substantially enlarged cross-sectional area of flexible diaphragm 70 to provide the necessary lifting force against compressive spring 64 thereby opening valve 14. Accordingly, valve 14 snaps open allowing vapor 32 to pass from conduit 26 into conduit 28 and pumping member 36.

Valve 14 provides significant advantages in that (1) the vacuum in pumping member 36 is effectively shut off at flexible diaphragm 70, (2) the extended cross-sectional area of flexible diaphragm 70 accommodates sufficient lifting force per unit of area to overcome spring 64 and open valve 14 and, (3) the assistance provided by magnet 54 allows valve 14 to be opened suddenly.

Diminishment in pressure in vapor 32 decreases the upward lifting force against flexible diaphragm 70 allowing spring 64 to overcome the magnetic attraction between magnet 54 and head 58 so that stopper 60 snaps downwardly pressing flexible diaphragm 70 against valve seat 62. The cessation of vapor 32 flowing into pumping diaphragm 36 initiates the major portion of the condensation cycle with its subsequent development of the partial vacuum in pumping diaphragms 36.

The rapid introduction of vapor 32 into expandable pumping member 36 upon opening of valve 14 causes pumping member 36 to rapidly expand from its deflated condition indicated by broken lines 36a to its expanded condition indicated by broken lines 36b. The change in volume of pumping member 36 displaces a corresponding volume of water from pumping chamber 16 through check valve 40.

Correspondingly, the increased surface area of the expanded pumping member 36, as indicated by the expanded position 36b, results in a significantly increased surface area for heat exchange through the surface of pumping member 36. Accordingly, heat transfer occurs across pumping member 36 between the water in pumping chamber 16 and vapor 32 inside pumping member 36 changing vapor 32 to condensate 30. Condensate 30 formed thereby runs out the base of pumping member 36 and collects as a pool of condensate 30 in a condensate reservoir column 34.

The collection of condensate 30 generally occurs after the closure of valve 14. Accordingly, the heat-powered water pump 10 is in a water intake state since the condensation of vapor 32 results in a decrease of the size of pumping member 36 to the deflated condition indicated schematically at 36a. Under these conditions, check valve 40 closes and a partial vacuum is created in pumping chamber 16 causing atmospheric pressure on the surface of water 50 to force water 48 upwardly through check valve 42 into pumping chamber 16.

During the foregoing water intake state, condensate 30 continues to collect in condensate collection reservoir 34 until it develops a hydrostatic head sufficient to overcome check valve 38 to enter cylinder 22 of vapor generator 12. The reentry of condensate 30 into vapor generator 12 commences the next pumping cycle of heat-powered water pump 10.

Importantly, valve 14 accommodates a pressure buildup in vapor 32 so as to provide a relatively rapid expansion (about three seconds) of pumping member 36. The rapid expansion of pumping diaphragm 36 minimizes the time available for heat transfer during the pumping cycle thereby lowering energy loss between vapor 32 and the water in pumping chamber 16. Accordingly, since the inside of the pumping member 36 remains relatively hot, the thermal hysterisis of the system is substantially eliminated. Pumping member 36 is fabricated from any suitable, expandable material which is sufficiently inert to either the water or the working fluid as vapor 32 or condensate 30. Correspondingly, the working fluid is chosen so as to be compatible with the material of pumping member 36.

In light of the relatively rapid expansion of pumping member 36, check valve 40 is fabricated with a relatively large cross-sectional area available for flow so as to permit the rapid expulsion of water upwardly therethrough from pumping chamber 16. Check valve 40 is configured to cooperate with an annular valve seat 42 and is centered thereover by a plurality of fingers 44 extending downwardly thereunder. An overlying water level 46 above check valve 40 assists in sealing check valve 40 against air entry. Additionally, the relatively large size of check valve 40 means that a greater force will be pulling the valve body downwardly into sealing relationship with annular flange 42. Water above level 46 is discharged as water 49 where it may be suitably utilized for irrigation, culinary purposes or the like.

Collapse of pumping member 36 to its collapsed state indicated by broken lines 36a is relatively slow (about 20 seconds) giving water 48 sufficient time to pass through check valve 52 into pumping chamber 16 as set forth hereinbefore.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a U.S. Letters Patent is:

1. A heat-powered water pump comprising:
    a pumping chamber having a diametrally enlarged outlet check valve and fluid communication with a body of water through an inlet check valve;
    an inflatable pumping member in the pumping chamber;
    a vapor generator for producing a vapor under pressure;
    a valve means for directing the vapor into the pumping member, said valve means being configurated to have a first, greater resistance to initial opening and held open under a second, lesser opening force by vapor from the vapor generator, the vapor expanding the pumping member to expel water from the pumping chamber through the outlet check valve; and
    condensate return means for returning condensed vapor to the vapor generator.

2. A method for pumping water comprising:
    enclosing an inflatable pumping member in a pumping chamber, the pumping chamber having an upper, diametrally enlarged check valve and an inlet for water from a lower body of water;
    vaporizing a liquid to produce a vapor pressure;
    restraining the vapor until a preselected vapor pressure is attained;
    expelling water from the pumping chamber through the upper check valve by directing vapor into the inflatable pumping member to expand the volume of the pumping member thereby displacing water in the pumping chamber; and
    drawing water from the body of water into the pumping chamber by condensing the vapor in the pumping member thereby decreasing the volume of the pumping member.

3. The method of claim 2 wherein the vaporizing step comprises exposing a vapor generator to at least one of a solar flux and heat from a combustion source.

4. A water pump comprising:
    a vapor generator;
    valve means for controlling release of vapor from the vapor generator the valve means being configurated to have a first, greater resistance to initial opening and is held open under a second, lesser opening force by vapor from the vapor generator; and
    a pumping chamber having a pumping member operable by said vapor to expel water from the pumping chamber.

5. The water pump defined in claim 4 wherein the pumping chamber further comprises a diametrally enlarged check valve body configured to rest in sealing relationship on a horizontal valve seat under the action of gravity.

6. The water pump defined in claim 4 wherein the pumping member is fabricated as an expandable pumping member.

7. The water pump defined in claim 4 wherein the pumping member also serves as a heat exchange surface to remove thermal energy from the vapor to thereby condense the vapor.

8. The water pump defined in claim 7 wherein the apparatus further comprises a condensate reservoir and the condensed vapor is collected in the condensate reservoir until a predetermined quantity has been collected and is able to open a valve into the vapor generator.

9. The water pump defined in claim 4 wherein the vapor generator comprises an enclosed chamber having a lower, condensate entry and an upper, vapor exit.

10. The water pump defined in claim 9 wherein the enclosed chamber is configurated as a cylindrical column and the vapor exit is a coaxial tube having an open end near the upper end of the column, the column being oriented above the horizontal to maintain the vapor exit above the condensate level in the vapor generator.

11. The water pump defined in claim 9 wherein the enclosed chamber is surrounded by a solar flux reflective surface having foci in the vicinity of the enclosed chamber.

12. The water pump defined in claim 4 wherein the valve means comprises a magnetically assisted opening valve.

13. The water pump defined in claim 12 wherein the magnetically assisted opening valve comprises a ferromagnetic valve head, a magnet and a spring member having a strength incrementally greater than the magnetic attraction between the magnet and the ferromagnetic valve head.

14. The water pump defined in claim 13 wherein the valve comprises a flexible diaphragm and the spring member having a predetermined compressive strength to hold the flexible diaphragm against a vapor inlet, the area of the diaphragm being greater than the area of the inlet to accommodate a greater vapor lifting force against the spring than through the inlet alone.

15. The water pump defined in claim 14 wherein the valve comprises a vapor outlet closable by said flexible diaphragm under the action of a reduction of pressure in the pumping member.

* * * * *